April 19, 1960  C. B. F. MEYER  2,933,113
COMBO-TROLLEY-BENCH
Filed Oct. 27, 1958  2 Sheets-Sheet 1
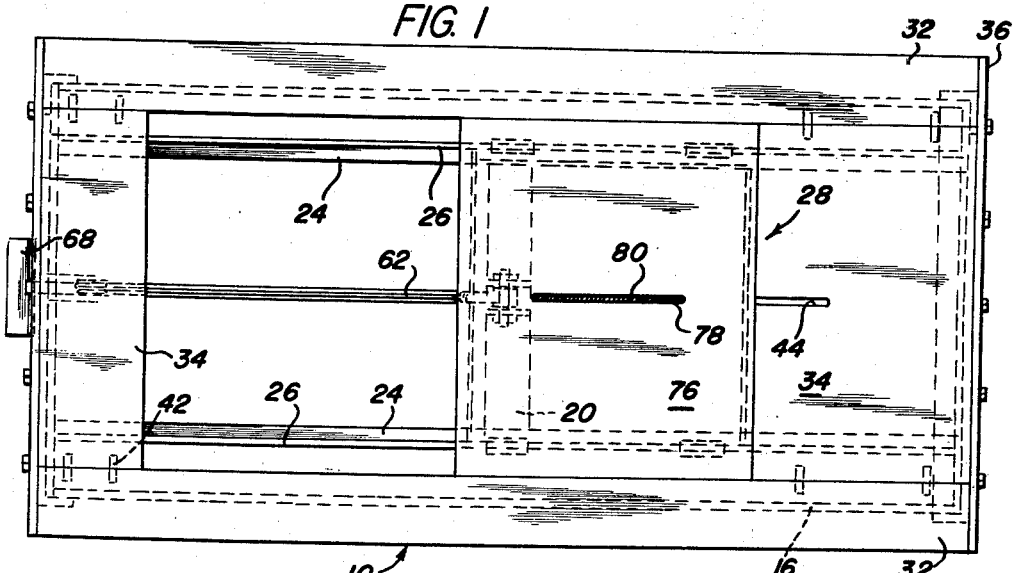
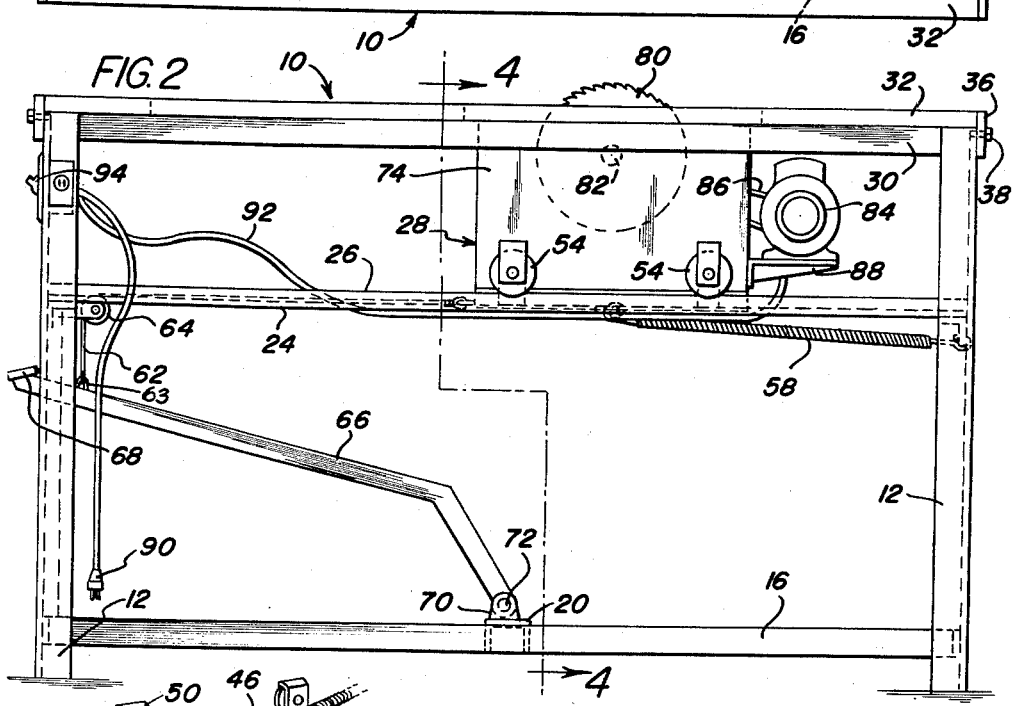
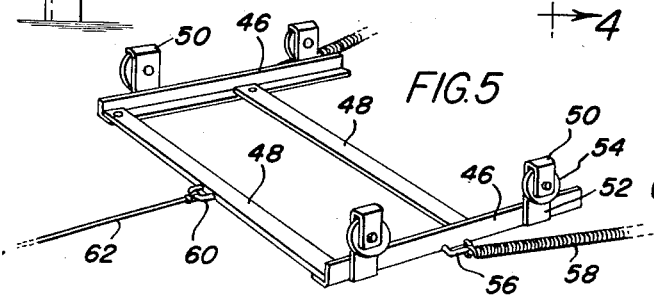
INVENTOR
CLARENCE B. F. MEYER
Joseph B. Lindecker
ATT'Y.

April 19, 1960
C. B. F. MEYER
2,933,113
COMBO-TROLLEY-BENCH
Filed Oct. 27, 1958
2 Sheets-Sheet 2
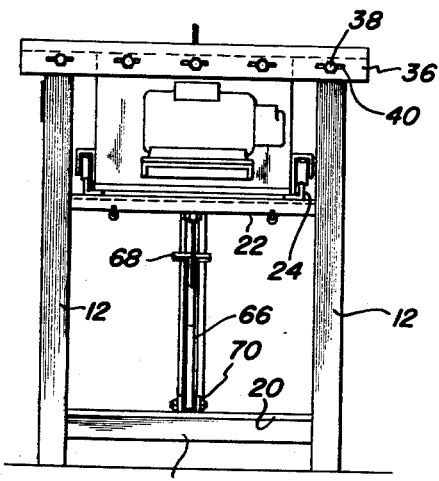
FIG. 3
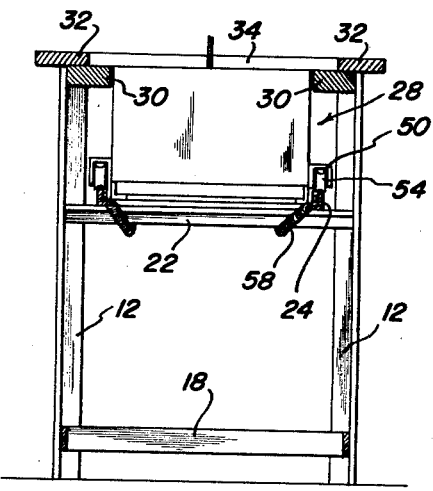
FIG. 4
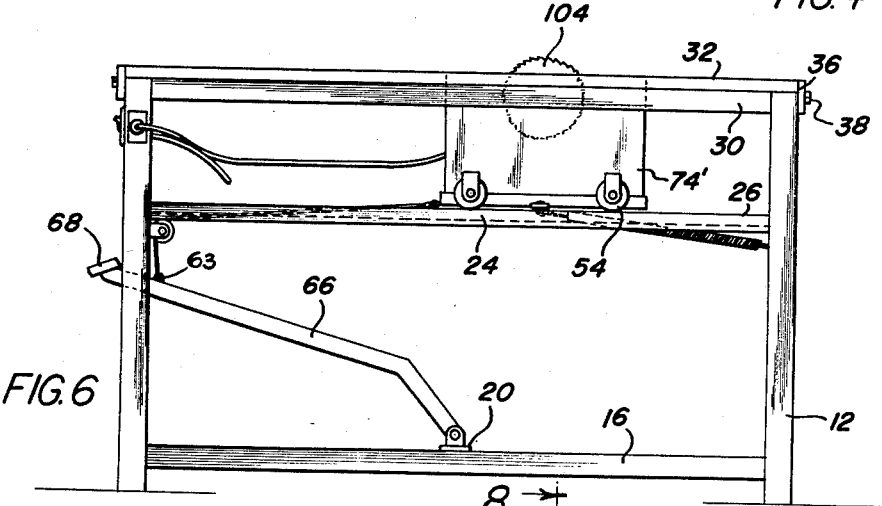
FIG. 6
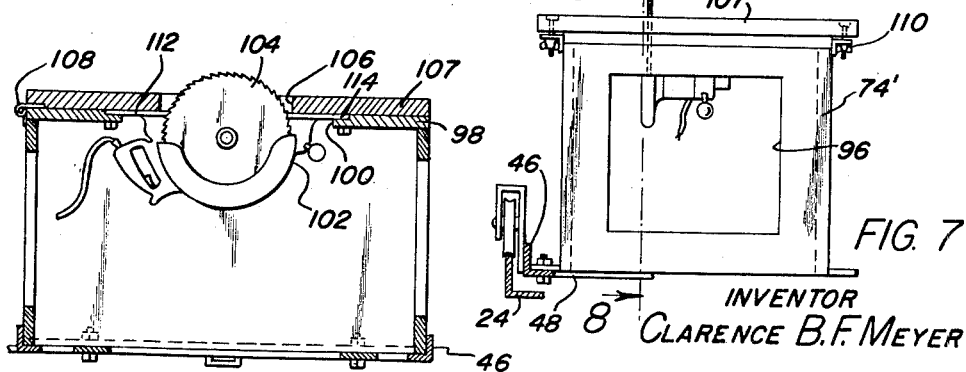
FIG. 8
FIG. 7
INVENTOR
CLARENCE B.F. MEYER
Joseph B. Lindecker
ATT'Y.

United States Patent Office 2,933,113
Patented Apr. 19, 1960

2,933,113

COMBO-TROLLEY-BENCH

Clarence B. F. Meyer, Wolcott, Ind.

Application October 27, 1958, Serial No. 769,648

4 Claims. (Cl. 143—47)

The present invention generally relates to a saw and more particularly to a bench saw construction incorporating a movable carriage supporting saw together with foot operated means for moving the carriage and saw, thereby leaving both hands free to control the piece of wood being cut.

The main object of the present invention is to provide a bench saw having a foot operated movable carriage having the saw and motor mounted thereon thereby permitting both hands to hold the work stationary while being cut.

Another object of the present invention is to provide a bench saw in accordance with the preceding object in which the carriage is rollingly supported on a pair of tracks and resiliently returned to a normal or retracted position.

A further object of the present invention is to provide a bench saw having an adapter for receiving and mounting a hand saw.

A still further object of the present invention is to provide a bench saw which is simple in construction, easy to use, effective in operation, and generally inexpensive to manufacture.

These and other objects will be apparent when taken in consideration with the specification and the following drawings:

Figure 1 is a plan view of the bench saw of the present invention;

Figure 2 is a side elevation of the saw;

Figure 3 is an end elevation of the saw;

Figure 4 is a transverse sectional view taken substantially along section line 4—4 of Figure 2;

Figure 5, sheet 1, is a perspective view of the carriage;

Figure 6 is a side elevation of a modified form of the invention showing an adapter for an electric hand saw mounted on the carriage;

Figure 7 is an end view of the carriage and parts shown in Fig. 6 and showing parts in section; and Figure 8 is a sectional view taken substantially upon a plane passing along section line 8—8 of Figure 7.

Referring specifically to the drawings, the numeral 10 generally designates the bench saw which includes four vertical corner legs 12 rigidly interconnected adjacent the lower ends by a pair of longitudinal braces 16 and a pair of transverse braces 18. The longitudinal braces 16 are rigidly interconnected by a transversely extending inverted channel-shaped member 20 generally disposed centrally of the braces 16.

At a point intermediate the upper end and center of the legs 12, the legs 12 are rigidly interconnected by a pair of transversely extending members 22 in the form of right angle members having the horizontal flanges thereof disposed uppermost. Extending between and rigid with the transverse member is a pair of parallel track members 24 in the form of right angle members having the horizontal flange at the bottom and the other flange terminating in a free edge 26 forming a track for movably supporting a carrier generally designated by the numeral 28.

Interconnecting the upper ends of the legs 12 is a pair of longitudinal frame members 30 flush with the upper ends of the legs 12 together with a pair of longitudinal plates 32 overlying the members 30 and the upper ends of the legs 12. A pair of end plates 34 interconnect the ends of the plates 32, the plate 34 at the rear of the bench being larger longitudinally than the plate at the front end of the bench. Each have one side edge flush with the end edges of the longitudinal plates 32. A transverse vertically disposed fence rail or bar 36 is mounted across the end edges of the plates 32 and receives an elongated rip fence (not shown). The rail 36 is attached with a series of bolts 38 and slots 40 which allow plates 32 to move laterally outwardly for receiving the plate 34 therebetween and registering the pin and socket connection 42 between the plates 32 and 34. This open top construction provides sliding space for the carriage and the larger of the plates 34 is provided with a slot 44 therein to accommodate a saw guard assembly.

The carriage 28 includes a pair of longitudinal rails 46 of right angle construction rigidly interconnected by a plurality of transverse braces 48, see Fig. 5. Each rail 46 is provided with an inverted U-shaped bracket 50 having an inner elongated leg 52 affixed to the rail and rotatably supporting a grooved wheel 54 between the inner and outer legs thereof for rolling engagement with the tracks 26 thereby rollingly supporting the carriage 28 for longitudinal movement on the tracks 26. Each rail 46 is also provided with an outwardly extending loop 56 for attachment of one end of a tension coil spring 58 having the other ends thereof attached to the transverse member 22 underneath the larger of the plates 34 for urging the carriage 28 towards that end of the device.

The transverse brace 48 remote from the springs 58 is provided with an attaching loop 60 to which a flexible line 62 is attached with line 62 being centrally arranged in relation to brace 48. A pulley 64 is mounted on transverse member 22 underneath the smaller of plates 34 and the line 62 is entrained over pulley 64 and is terminally attached to a loop 63 on an elongated lever 66 having a foot pedal 68 on one end thereof and the other being angulated downwardly and pivotally attached to a pair of lugs 70 on the transverse member 20 by virtue of a pivot pin 72.

A generally rectangular box-like frame 74 is mounted on the rails 46 and braces 48 and includes a top 76, see Fig. 1, with a slot 78 for receiving a rotary saw blade 80 mounted on shaft 82, see Fig. 2, and driven by motor 84 through V-belt drive 86. The motor 84 is adjustably mounted on frame 74 by a bracket 88. The motor 84 is supplied with electrical energy through the usual plug 90, conductor 92 and a switch 94 adjacent the operator's position for manipulation for controlling the operation of saw blade.

The construction of the carriage 28 is such that the same is underslung and by depressing the foot pedal 68, the carriage with the saw blade thereon is caused to move longitudinally for engaging a workpiece held by both hands of the operator.

Figures 6–8 illustrate the same construction except for the box-like frame 74' mounted on the rails 46 and braces 48. In this form of the invention the box-like frame is provided with enlarged openings 96 in the end walls thereof. The top 98 is provided with an opening 100 receiving a hand saw assembly 102 which includes a blade 104 projecting through a slot 106 in the saw table 107 which is offset to match the offset of the hand saw blade 104.

The table 107 is hinged to top 98 by hinges 108 and is held in position by bolts 110 thus retaining the base 112 of the hand saw in the groove 114 provided therefor in the top surface of the top 98 thereby permitting easy removal of the hand saw for use thereof in the usual manner.

In both forms of the invention, the saw carriage 28 is movable by operating the foot pedal thereby leaving both hands free to hold the material being cut by the saw blade.

The embodiments set forth in the specification are to be taken for illustration purposes only and not by way of limitation.

The present invention has been referred to as a bench saw. However, it may be referred to as a saw bench with a trolley.

The track members 24 have been shown rigidly secured to the legs 12; however, they may be constructed so as to permit vertical movement thereof.

The longitudinal plates 32 have been shown rigidly secured to the frame member 30, however, they may be constructed so as to permit lateral movement thereof if desired.

What is claimed is:

1. A bench saw comprising, a supporting framework, a saw table mounted on said framework, a saw carriage movably supported below said saw table, a powered saw blade mounted on said carriage and extending above the top surface of said saw table for cutting a work piece disposed thereon, said framework including a pair of vertical front legs and a pair of vertical rear legs, a pair of longitudinal side braces rigidly secured to the upper and lower ends of each of said front and rear legs on opposite sides of the framework, a pair of transverse support braces rigidly secured to the upper and lower ends of the front legs and the upper and lower ends of the rear legs, a pair of track supporting members extending transversely and rigidly secured to and intermediate the upper end and center of the front and rear legs, said track supporting members being right angle bars having the horizontal flange thereof disposed uppermost, a pair of longitudinal track members rigidly secured to said pair of transverse track supporting members at the front and rear of the framework, said track members being arranged parallel and spaced from each other and formed of right angle bars having the horizontal flange thereof arranged at the bottom for securement to the horizontal flanges of said track supporting bars, the vertical flange of each of said track members terminating in a longitudinal free edge forming a double track for movably supporting said saw carriage, said saw table composed of longitudinal, parallel and spaced apart side plates with a pair of transverse end plates interconnecting the ends thereof, said transverse plate at the rear end of said saw table being of greater longitudinal width than said plate at the front end thereof, said saw carriage being of rectangular box-like configuration embodying a pair of lower longitudinal box rails and a pair of transverse box braces with side walls and top panel assembled therewith, said top panel having a longitudinal slot therein for receiving said saw blade extending therethrough, each of said longitudinal box rails provided with an inverted U-shaped bracket at each end thereof having inner and outer legs, a grooved wheel rotatably mounted between said inner and outer legs of each of said ends of said brackets for rolling engagement with said longitudinal free edges of said track members, and means on said framework and connected to said saw carriage for moving the carriage longitudinally on the double track.

2. The structure as defined in claim 1 wherein said means for moving the saw carriage includes a pair of springs extending between the saw carriage and the track supporting member at the rear of said framework for urging the carriage in one direction, a flexible line connected to the forward end of said saw carriage, a pulley on said framework receiving said line, said pulley being attached to the track supporting member at the front end of the framework in opposite relation to the spring, a transverse member disposed centrally between said lower longitudinal side braces, and a foot operated pedal pivotally mounted intermediate the ends of said transverse member between said side braces and intermediate its ends, said line being connected to the pedal whereby pivotal movement of the pedal will move the carriage.

3. The structure as defined in claim 1 wherein said carriage includes a motor, and a belt drive for powering said saw blade.

4. The structure as defined in claim 1 wherein said powered saw blade is mounted on a portable electric hand saw, said carriage having a top with grooved edge removably receiving the base of the hand saw.

References Cited in the file of this patent

UNITED STATES PATENTS

| 1,813,783 | Tomlinson et al. | July 7, 1931 |
| 1,930,168 | Hall | Oct. 10, 1933 |
| 2,513,873 | Horton | July 4, 1950 |
| 2,548,279 | Young | Apr. 10, 1951 |
| 2,599,096 | Dirksen | June 3, 1952 |
| 2,703,115 | Beagle | Mar. 1, 1955 |
| 2,767,747 | Burrows | Oct. 23, 1956 |
| 2,810,412 | Roug | Oct. 22, 1957 |

FOREIGN PATENTS

| 120,047 | Switzerland | May 2, 1957 |